Jan. 17, 1928.
L. BADARACCO
NOZZLE
Filed Oct. 7, 1925
1,656,160
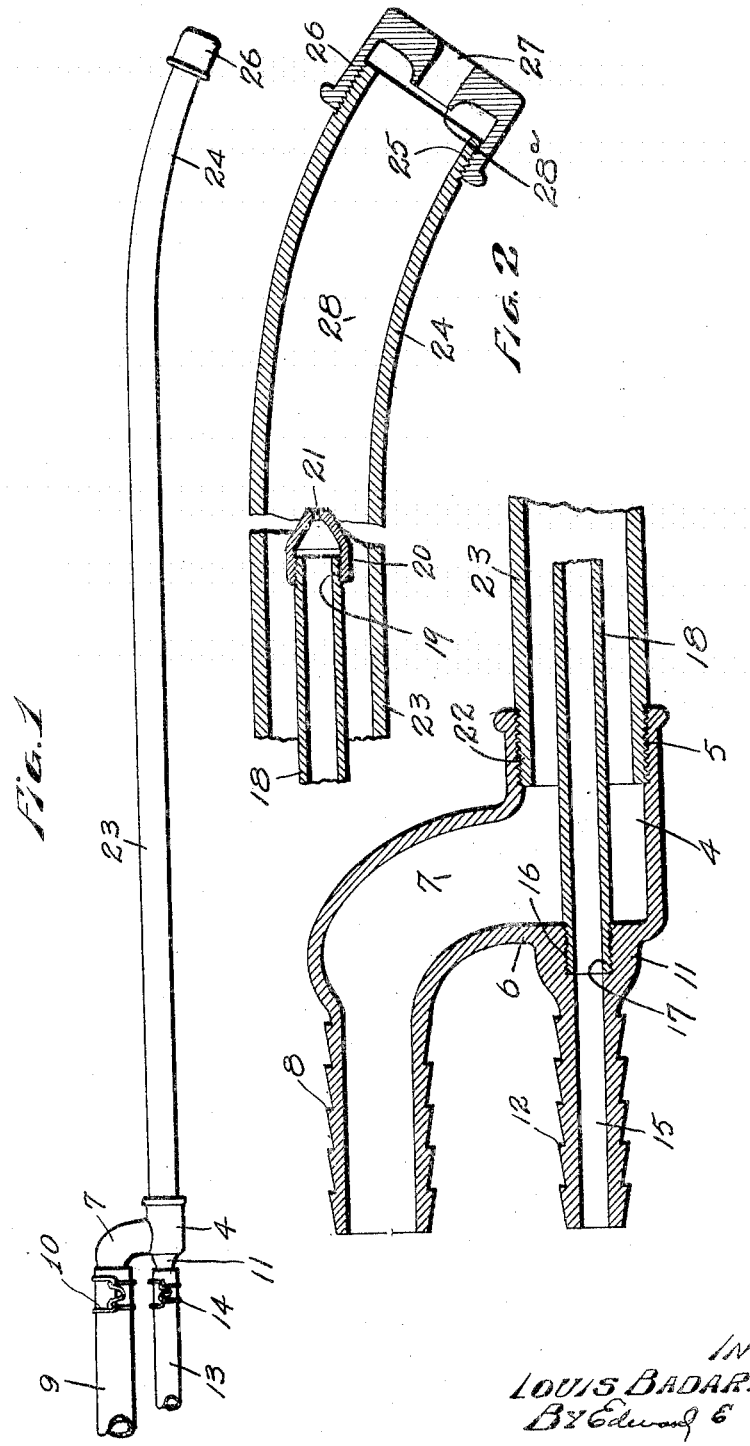
INVENTOR
LOUIS BADARACCO
By Edward E. Longan
ATTY.

Patented Jan. 17, 1928.

1,656,160

UNITED STATES PATENT OFFICE.

LOUIS BADARACCO, OF ST. LOUIS, MISSOURI, ASSIGNOR TO THE AUTO LAUNDRY SYSTEM COMPANY, OF ST. LOUIS, MISSOURI, A CORPORATION OF MISSOURI.

NOZZLE.

Application filed October 7, 1925. Serial No. 61,040.

My invention relates to improvements in nozzles, and has for its primary object a nozzle designed for washing automobiles, which is so constructed that a mixture of air and water issues from the tip thereof at a high velocity so that heavy accumulations of dirt can be removed without any danger of scratching, or otherwise marring, the finish of the vehicle.

A further object is to construct a nozzle, which is provided with separate liquid and air inlets and in which the intermingling of the air and liquid takes place within the nozzle and preferably near its discharge end so that when the liquid and air emerge from the tip of the nozzle, they will be thoroughly intermingled so that a mist is discharged from the nozzle. In this manner dirt accumulations are softened and floated off simultaneously so that no possibility of scratching is present in the device.

In the drawings:

Fig. 1 is a side elevation of my improved nozzle with the air and liquid hoses attached thereto;

Fig. 2 is an enlarged vertical fragmental section of the forward part of the nozzle; and Fig. 3 is an enlarged vertical sectional view of the rear portion of the nozzle with the air and liquid hoses removed therefrom.

In the construction of my device, I employ a rear member composed of a cylindrical portion 4. The forward part of which is open and screw threaded as at 5, while the rear portion is closed as at 6. Opening into the cylindrical portion 4 is an elbow 7, which is curved upwardly and rearwardly and which terminates in a hollow corrugated member 8. The purpose of these corrugations is to securely hold a liquid hose 9, which is held in position on the corrugated member by means of a clamp 10. The hose 9 is secured to any suitable source of liquid supply not shown, as this may be either a tank which contains liquid, or it may be attached directly to a pipe through which liquid is supplied to the hose. Carried by the rear wall 6 is a boss 11, which is provided with a corrugated extension 12 to which is attached an air hose 13. This air hose is secured in position by means of a clamp 14. The air hose also leads to a suitable source of air supply not shown, which may be either a tank or a direct connection to an air pump. The extension 12 is provided with a bore 15 through which the air from the hose 13 passes. The boss 11 is provided with a screw threaded hose 16, which is concentric with the bore 15, and in which the end 17 of a pipe 18 is secured. The forward end of the pipe 18 is screw threaded as at 19, and over this screw threaded portion is secured a tip 20, which is preferably tapered as illustrated in Fig. 2 and which is provided with a restricted outlet 21.

Secured within the screw threaded portion 5 of the cylindrical member 4 is the screw threaded end 22 of a pipe 23. The opposite end of this pipe is curved as indicated by the numeral 24 and is provided with screw threads 25 on which the tip 26 is secured. The tip is provided with an opening 27 through which the mixture of water and air emerge. It will be noted from Fig. 2 that the tip 20 is located at some distance to the rear of the tip 26, thus providing a chamber 28 in which the air and liquid can be thoroughly intermingled before passing through the orifice 27.

The pipe 18 when in position is located concentric with the pipe 23 so that the liquid can completely surround the pipe 18. The purpose of this is to permit practically an unrestricted flow of liquid through the pipe 23 and to discharge the air from the pipe 18 substantially in the center of the liquid column. In this manner, I am enabled to obtain a much more thorough mixture of air and liquid than would be possible if the tip 20 were located to one side of the liquid within the pipe 23. Furthermore by having a restricted opening in the tip 26, it is obvious that the liquid will strike the inturned portion 28 of the tip which surrounds the opening 27 and rebound so that the liquid will be given a swirling movement or motion within the mixing chamber 28. This feature permits the liquid to more readily and thoroughly intermingle with the air passing through the opening 21 and consequently the liquid and air discharged through the opening 27 will pass out as a fine spray or mist.

In the operation of my device, I preferably have the air under such pressure that when the mixture is discharged from the nozzle, the amount of air will be in excess of the amount of liquid. In this way the primary purpose of the liquid is merely to soften the dirt accumulations and act as a lubricant on the surface to be cleaned so that the mixture can readily float the dirt particles from the surface without scratching.

Having fully described my invention, what I claim is:—

1. A nozzle comprising a rear member having a water inlet and an air inlet, a water pipe having a curved outer end carried by said rear member, a tip carried by the outer end of said water pipe, said tip having an orifice surrounded by an inwardly extending flange whereby water passing through said pipe is given a swirling motion therein near the tip, and a straight pipe carried by said rear member and located within the water pipe and communicating with the air inlet, said pipe provided with a tip located to the rear of the curved end of the first mentioned tip for discharging air under pressure into said swirling water whereby said water is mixed with said air and ejected from the first mentioned tip in the form of a mist.

2. A nozzle comprising a rear member having a water inlet and an air inlet, a water pipe carried by said rear member, a tip carried by the outer end of said water pipe, said tip having an orifice surrounded by an inwardly extending flange whereby water passing through said pipe is given a swirling motion near the tip, a second pipe carried by said rear member and located within the water pipe, said second mentioned pipe communicating with the air inlet and being provided on its outer end with a tip located to the rear and spaced apart from the inwardly extending flange for discharging air under pressure into said swirling water whereby said water is mixed with said air and ejected from the first mentioned tip in the form of a mist.

In testimony whereof I have affixed my signature.

LOUIS BADARACCO.